United States Patent

Alber et al.

[11] Patent Number: 5,902,497
[45] Date of Patent: May 11, 1999

[54] PROCESS AND DEVICE FOR COOLING THE AREA OF A WELD DURING LASER WELDING

[75] Inventors: Gerhard Alber; Alexander Schmeh, both of Ravensburg, Germany

[73] Assignee: Thyssen Industrie AG, Essen, Germany

[21] Appl. No.: 08/817,908

[22] PCT Filed: Oct. 14, 1995

[86] PCT No.: PCT/EP95/04044

§ 371 Date: Jun. 11, 1997

§ 102(e) Date: Jun. 11, 1997

[87] PCT Pub. No.: WO96/11770

PCT Pub. Date: Apr. 25, 1996

[30] Foreign Application Priority Data

Oct. 18, 1994 [DE] Germany .............................. 44 37 191

[51] Int. Cl.$^6$ .................................................. B23K 26/14
[52] U.S. Cl. ................................ 219/121.63; 219/121.64; 219/121.84

[58] Field of Search .......................... 219/121.63, 121.64, 219/121.84

[56] References Cited

U.S. PATENT DOCUMENTS 5,204,505  4/1993  Prange et al. ...................... 219/121.63

FOREIGN PATENT DOCUMENTS 2-293061  12/1990  Japan .
5-154674   6/1993  Japan .
6-218572   8/1994  Japan .

*Primary Examiner*—Gregory Mills
*Attorney, Agent, or Firm*—McGlew and Tuttle, P.C.

[57] ABSTRACT

A process and an apparatus for the cooling of a welding seam area during laser welding of plates or strips, preferably used in car body construction in automotive engineering. It is described how expediently the cooling agent supply and also the supply of an inert gas veil built up between the focus and liquid coolant is achieved so that the liquid coolant is prevented from entering the welding seam area and causing detrimental effects there.

17 Claims, 3 Drawing Sheets

DIRECTION OF WELD PROGRESSION

DIRECTION OF WELD PROGRESSION

PROCESS AND DEVICE FOR COOLING THE AREA OF A WELD DURING LASER WELDING

FIELD OF THE INVENTION

The present invention refers to a process for the cooling of a welding seam area during laser welding of plates or strips, particularly for use in car body construction by the directed infeed of a liquid cooling agent.

BACKGROUND OF THE INVENTION

Moreover, the invention relates to an apparatus required for the implementation of this process. During the laser welding of plates and strips that, for example, are used in car body construction, the quality of the welding seam is of great significance. During butt welding the width of the gap is instrumental in assuring the quality of the weld. If the gap is too wide, the laser beam "falls through" or the weld quality deteriorates to an extent that scrap is produced. Due to the high volume of energy applied at the laser beam focus there is a risk that as a result of thermal expansion in the plate this applied energy causes a gap ahead of the focal point that severely impedes the quality of the welding seam. For that reason, cooling of the welding seam area is of great importance since an effective cooling will prevent gap formation.

During laser welding a cooling action by ambient air is well known as is the injection of cooling air through nozzles or the infeed of gases such as helium or argon. Furthermore, cooling methods involving clamping jaws or copper ledges have also been employed. For example, cooling a weld area with gaseous media during laser welding is known as prior art from EP 0 450 349.

The processes covered by prior art are partly unsatisfactory as far as their cooling performance is concerned, to some extent they require substantial expenditure for equipment. When the cooling process involves gases considerable gas volumes have to be blown onto the welding seam to obtain results that can viewed as fairly, if at all acceptable. If cooling of the weld seam area is to be effected by means of clamping jaws, e.g. for copper ledges (EP 01 89 806), these have to be carefully controlled and arranged. Moreover, cooling by clamping jaws is not feasible in the event of continuous welding processes.

From DE 40 10 077 a process is known for the continuous welding of abutting strips (plates) by means of a laser beam without adding filler metal. This process provides for the strips to be cooled in the area of the welding seam immediately after the welding focus so that the cooling intensity is controlled as a function of the width of the gap formed directly before the welding focus by the abutting edges of the strip in strip running direction in such a manner that this gap width remains within a tolerance range. From this process it is also known that cooling can be effected on both sides of the strip. For cooling, a gaseous medium is proposed, preferably air. To get as close as possible to the welding focus the narrow tip of the injection nozzles is envisaged to project into the gap between the clamping rollers. The blowing direction of the injected gaseous medium is away from the welding focus. Controlling the cooling intensity of the injected gaseous medium is achieved by way of its flow rate. In connection with this process an apparatus for the continuous welding of abutting strips (plates) by means of a stationary welding beam acting on the abutting strip edges is proposed that includes clamping rollers arranged in pairs vertically to the running strip direction at both sides of the strips to be welded, said clamping rollers forming a gap in the area of the joint of the strip through which the stationary laser beam hits the abutting edges to be welded. For this purpose a control apparatus is employed that has a measuring unit located in the direction of strip travel immediately ahead of the welding focus monitoring, as actual value, the width of the gap formed by the abutting strip edges and a cooling unit arranged in the direction of strip travel behind the welding focus and acting on the strips in the area of the weld seam, the cooling intensity of this unit being adjusted as a function of the actual value representing the gap width being constant within prescribed tolerance limits and being furnished by the measuring unit. The measuring unit consists of a radiating source arranged on one strip side and a radiation receptor arranged on the other. This radiating source can be a laser whereas the radiation receptor is a diode line camera.

Furthermore, the cooling unit has blowing nozzles for the gaseous medium. The gas cooling process requires a considerable consumption of gas and its cooling capacity is only limited.

DE 30 37 981 relates to a process for fusion and cutting welding, welding, sublimation cutting, drilling, marking as well as fine machining of materials by means of a laser beam with such beam being generated, directed, focused through a lens and projected onto the surface of the workpiece to be processed. Moreover, an inert or reactive gas is admitted to the focused spot thus generated coaxially to the laser beam. The focused spot can be displaced without an additional lateral correction of the workpiece coordinates and/or a nozzle opening of the laser beam in the direction of the laser beam axis relative to a fixed reference point on the axis, with the workpiece surface in the focused spot and in its immediate vicinity being cooled by a gaseous or liquid coolant stream concentrically applied to this surface. In this case the arrangement shall provide for a coolant of the workpiece in the form of at least one liquid jet located on an envelope of a cone coaxial to the laser beam the tip of which being located at least approximately in the focused spot.

From DE 41 33 350 a process is known as prior art that provides for the cutting of a prescribed pattern through the wall of a hollow metallic workpiece by means of a laser, with a liquid coolant being pumped through the workpiece supporting fixture and metallic workpiece so that the coolant passes through the workpiece during pattern cutting by means of a laser cutting apparatus and during this process contacts at least some part of the inner workpiece surface with a view to purging out slag particles that may form during cutting which minimizes or rules out an adherence of such slag particles to the inside of the workpiece. A water/oil mixture in the range of 50 parts of water and 50 parts of oil up to approximately 90 percent of water and 10 percent of oil, each based on volume, is to be used as coolant. When applying this liquid cooling method danger exists that liquid enters the focus or runs into a molten pool.

SUMMARY AND OBJECTS OF THE INVENTION

Initially, the invention aims at improving a previously known generic process in such a manner that an always uniform welding seam quality can be achieved at high welding capacity. Moreover, it is the objective of the invention to provide an advantageous apparatus necessary for the implementation of the process covered by the proposed invention, with this apparatus being of simple design and suitable particularly for the welding of plates and strips that can also be coated or treated on both sides and are used in the construction of car bodies.

According to the invention, a process is provided for cooling of the welding seam area during laser welding of plates or strips. The process includes directed infeeding of a liquid cooling agent for cooling and welding seam area at a location closely spaced to a welding focus. An inert gas is fed continuously under pressure to an area between the liquid coolant and the welding seam area wherein the inert gas separates the welding seam area from the liquid coolant.

The apparatus of the invention preferably includes a laser beam welding means as well as welding head forming a welding seam on workpieces. Ducting nozzle means is provided for directed feeding of a cooling agent to the welded workpieces for the purpose of cooling a welding seam area. Protective gas nozzle means is provided for feeding of protective gas continuously under pressure to an area between the cooling agent and the welding seam area. The ducting nozzle means and the protective gas nozzle means are formed as part of triplex nozzle means including three nozzles arranged one after the other in the direction of a weld progression of the welding head. The protective gas nozzle means is a front nozzle facing the weld seam area and serving to feed in the protective gas. A further nozzle or middle nozzle is provided behind the front nozzle in the direction of weld progression to feed in an inert gas. The ducting nozzle means is arranged as a third nozzle behind the middle nozzle in the direction of weld progression to feed in a liquid as the cooling agent. All three nozzles are connected to separate supply lines or ducts. The triplex nozzle means is fixed relative to the welding head.

According to the process provided by the invention a curtain of inert gas, e.g. of argon or helium, is produced that prevents the cooling water from coming too close to the welding focus and thus possibly having a detrimental effect on the weld seam. In this way, the cooling of plates or strips can be achieved by means of a liquid medium, e.g. water, water with corrosion-inhibiting additives, oils, liquid nitrogen or the like, without disadvantages to be expected.

According to a further feature of the invention, the inert gas is introduced at gauge pressure over atmospheric in the form of a curtain located between the zone where the protective gas blanket is situated and the liquid coolant.

In this manner the liquid coolant can be fed to the welding seam area on one or both sides. In the same manner, inert gas as well can be fed in, that is to one or both sides in the way and manner described. This enables the required intensive cooling effect to be achieved in the welding seam area, that is directly ahead of the focal point, simultaneously maintaining the high weld quality standard.

In accordance with a further feature of the invention, the liquid coolant can be applied to the welding seam area in the form of a gush, advancing jet or shower whereas the inert gas is fed in as a thin curtain or as some sort of pressure cushion between the welding seam area and the coolant. This enables either a small area or a larger surface section to be cooled with the required intensity.

According to a further feature of the invention, the volume of the coolant and/or inert gas per unit of time can be controlled or regulated. For example, this can be carried out via a valve manually or automatically actuated.

For instance, in conformity with another aspect of the invention, the volume of the coolant and/or inert gas per unit of time can be controlled by a temperature control system. For this purpose, the temperature in the progressing seam gap or in the area of the seam cross section can be detected, and if a prescribed setpoint—taking appropriate tolerances into account—is exceeded the coolant flow rate can be adjusted as required.

Another possible embodiment according to further features of the invention provides that the spreading force exerted to secure the plates or strips in the fixture is employed as control variable. For this purpose, the jaws can be supported in a floating or movable arrangement, e.g. supported by a piston, and thus control the coolant and/or inert gas flow as a function of the spreading force.

The volume rate of flow of the liquid coolant and inert gas can be controlled as a function of the plate thickness.

In accordance with further features of the invention, the liquid coolant can be withdrawn and/or intercepted at a certain distance away from the focus.

Another embodiment of the invention provides for the welding seam area to be dried by hot air or inductively to remove the liquid medium applied.

To prevent a direct injection of the liquid coolant in the welding focus the liquid coolant and the inert gas are applied, away from the focus, to the weld seam area to be cooled.

The apparatus used to cool the welding seam area is relatively simple from a design angle and does not require any precautionary measures to be taken. Particularly, the dimensions transverse to the longitudinal direction of the plates and strips do not become larger or only to an insignificant extent because the apparatus according to the invention is of relatively compact size which is especially true for the triplex nozzle applying a protective gas blanket at the weld focus, feeding in the inert gas and the liquid coolant.

The invention is explained in detail, by way of example and partly as schematic views, on the basis of the attached Figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Reference number 1 denotes a laser beam that is generated by a common laser welding equipment not shown here in more detail.

Figure 1:
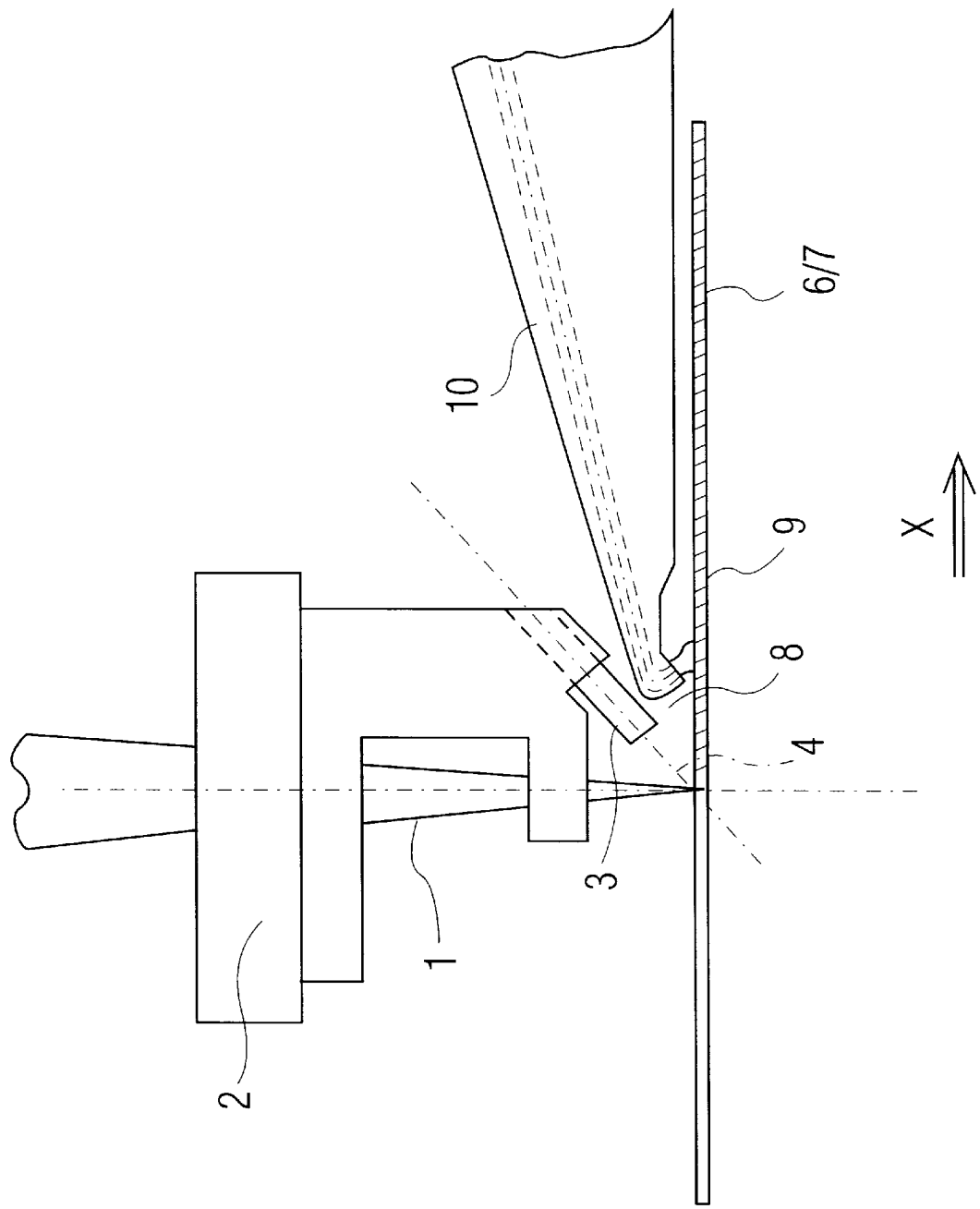
FIG. 1 is a side partially truncated view of an apparatus according to the invention.
Figure 2:
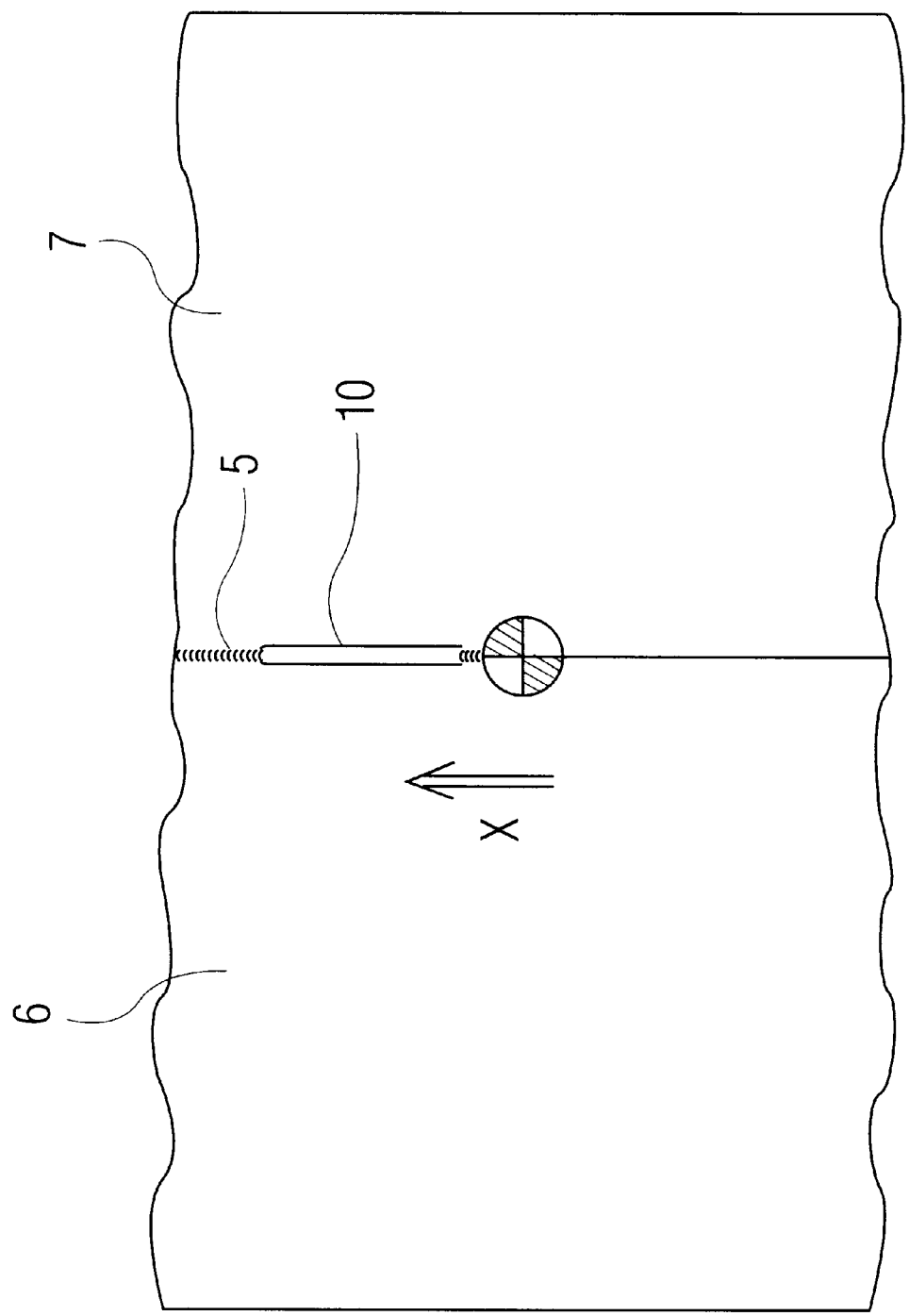
FIG. 2 is a partial top view of two plates or strips to be welded together.

Reference number 2, however, denotes a welding head, whereas 3 indicates a protective gas nozzle through which a suitable protective gas is fed to the welding seam area 4. Welding seam 5 itself has only been shown schematically in FIG. 2, this seam connecting the abutting plates or strips 6 and 7.

Into the acute-angled area 8 formed by the protective gas nozzle 3 on the one hand and surface 9 of plates or strips 6, 7 on the other, a tube or nozzle 10 projects feeding in a suitable liquid coolant, e.g. water. The orifice opening 10 can be of circular but also of another shape, for instance of rectangular design. In the latter case, it extends over a certain area transverse to the direction of welding X into which the laser beam I moves relative to the weld seam 5. An intercepting device arranged below the plates or strips 6, 7, a trough or an exhaust unit or a heating feature by means of hot air or an inductive heating of the plates or strips 6 and 7 have not been shown in the figure. Furthermore, the figure does not show the conveying means, e.g. winders, for the upcoiling of the strips 6 and 7, gripping and stacking equipment for strips 6 and 7 and auxiliary devices for the feeding as well as controlling and/or regulating of the liquid coolant; pumps and motor drives have not been shown either.

Reference number 11 denotes a duct or pipe through which a suitable protective gas is led to the weld seam area via a nozzle 12.

At a certain distance in the direction of weld progression behind duct 11 another duct 13 has been arranged that also ends in a nozzle 14. Through duct 13 an inert gas, e.g. argon, krypton, helium or similar medium, is passed.

Figure 3:
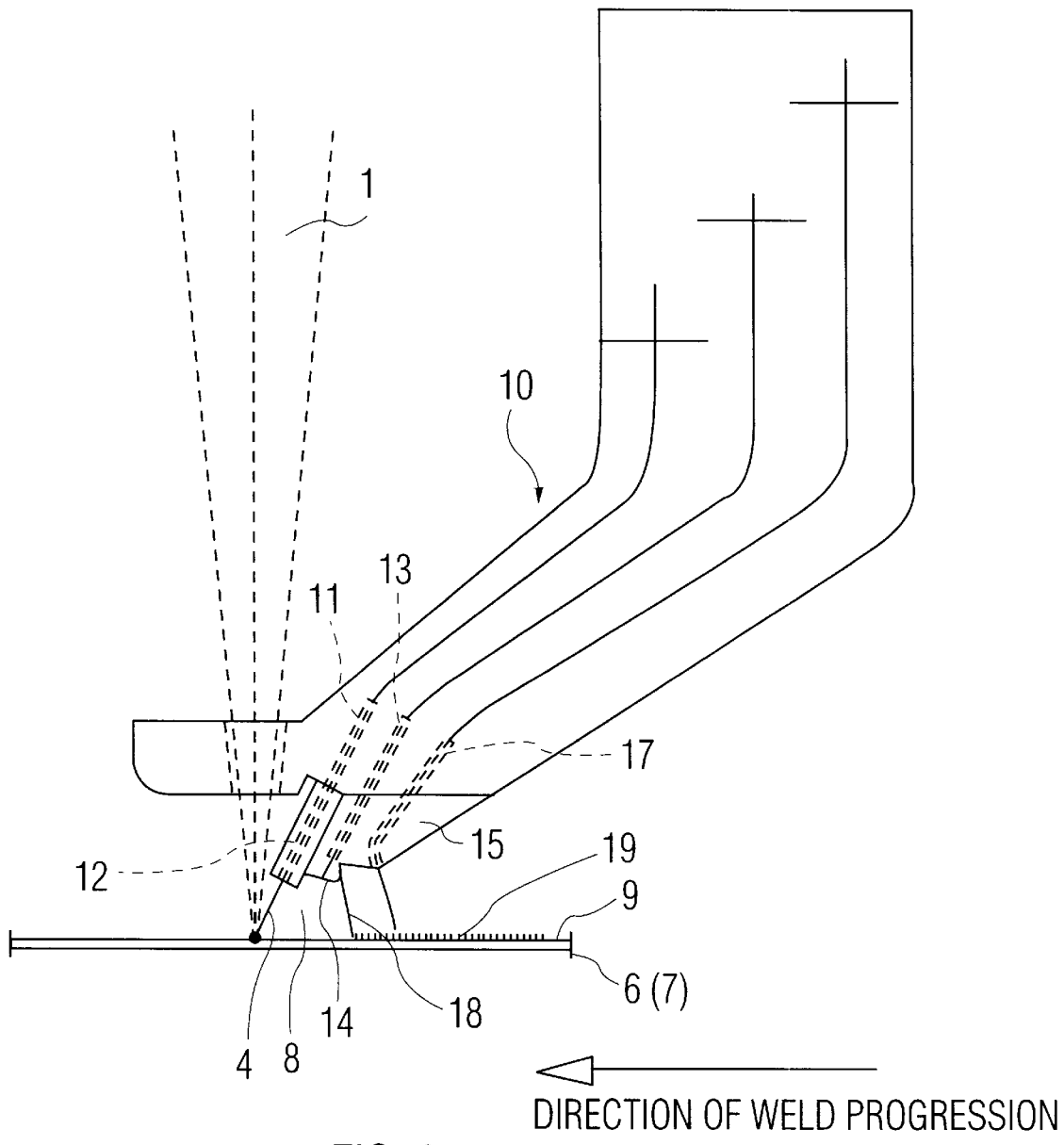
FIG. 3 is a detailed representation a nozzle according to the invention designed as triplex nozzle.

Moreover, another nozzle 15 is located behind nozzle 14, said nozzle 15 being connected to a duct 16. A liquid coolant, e.g. water, is supplied to duct 16. The mouth has been positioned in such a manner that the water curtain, water gush or water jet is directed away from the weld seam area 4. This has been implied by reference number 17 in FIG. 3. Number 19 is a schematic representation of the water film on the plate 6, 7.

As can be seen, a gas curtain 18 is produced by the liberation of inert gas in the area of the nozzle 14, this gas curtain separating the welding seam area 4 from the water gush or water curtain 17 or the like.

All nozzles 12, 14 and 15 can be designed as broad-band nozzles, e.g. having square or, over their cross section, rectangularly shaped mouth openings. The mouth opening of protective gas nozzle 12 is directed towards the weld seam area 4 whereas the mouth openings of nozzles 14 and 15 are directed away from the weld seam area by a certain angle. For that reason, the gas curtain 18 in FIG. 3 has been schematically shown so as to be directed away from the weld seam area 4.

The volume of the coolant and/or inert gas per unit of time can be controlled or regulated, for example, via a manually or automatically actuated valve.

The volume of the coolant and/or inert gas per unit of time can be controlled by a temperature control system. For this purpose the temperature in the progressing seam gap or in the area of the seam cross section can be detected, and if a prescribed setpoint—taking appropriate tolerances into account—is exceeded the coolant flow rate can be adjusted as required.

In another embodiment, the spreading force exerted to secure the plates or strips in the fixture is employed as a control variable. The spreading force is the force required to hold the plates or strips together by maintaining the set welding seam gap. For this purpose, the jaws can be supported in a floating or movable arrangement, e.g. supported by a piston, and thus control the coolant and/or inert gas flow as a function of the spreading force.

The volume rate of flow of the liquid coolant and inert gas can also be controlled as a function of the plate thickness.

The features of the invention described in the abstract, patent claims and description as well as shown in the drawings can be of significance to the realization of the invention, either individually or in optional combinations.

While specific embodiments of the invention have been shown and described in detail to illustrate the application of the principles of the invention, it will be understood that the invention may be embodied otherwise without departing from such principles.

We claim:

1. A process for cooling a welding seam area during laser welding of plates or strips in which a protective gas is fed as a first stream to a welding focus, the process comprising the steps of:

directing infeeding of a liquid cooling agent for cooling a welding seam area at a location closely spaced to a welding focus;

feeding an inert gas continuously under pressure separately from the protective gas and the liquid cooling agent as a second stream to an area between the liquid coolant and the welding seam area so that, the second stream of inert gas provides a barrier separating the welding seam area from the liquid coolant;

the liquid coolant and the inert gas being fed in at locations behind a welding focus and the welding seam area in the direction of weld progression and directed away from the welding seam area.

2. The process according to claim 1 wherein inert gas and the liquid coolant are fed under gauge pressure to one or both of a top and bottom side of the plates or strips which are to be welded.

3. The process according to claim 1 wherein the liquid coolant and the inert gas are fed in as one of a gush, jet, shower or curtain.

4. The process according to claim 1 wherein the volume of the liquid coolant and the inert gas per unit of time is controlled or regulated as a function of welding speed.

5. The process according to claim 1 wherein the volume of the liquid coolant and the inert gas per unit of time is regulated by means of a temperature control system.

6. The process according to claim 1 wherein the volume of the liquid coolant and the inert gas per unit of time is regulated by means of a spreading force control feature.

7. The process according to claim 1 wherein the volume of the liquid coolant and the inert gas per unit of time is controlled or regulated as a function of the thickness of the plates or strips to be joined by welding.

8. The process according to claim 1 further comprising:
   one or both of withdrawing and intercepting the liquid coolant at a distance away from the welding seam.

9. The process according to claim 8, wherein the liquid coolant is withdrawn by heating surroundings of the welding seam area.

10. The process according to claim 1 wherein the volume flow of the liquid coolant per unit of time is regulated as a function of the distance between the plates, said distance being continuously detected ahead of the welding focus.

11. Process according to claim 10 for use in car body construction, and said inert gas is helium or argon and said detection of said distance is optical, by means of a camera.

12. An apparatus, comprising:
   laser beam welding means including a welding head forming a welding seam on workpieces;
   ducting nozzle means for directing feeding of a cooling agent to the welded workpieces for the purpose of cooling a welding seam area; and
   protective gas nozzle means for feeding a protective gas continuously under pressure to an area between the cooling agent and the welding seam area, wherein said ducting nozzle means and said protective gas nozzle means are formed as part of triplex nozzle means including three nozzles arranged one after the other in the direction of a weld progression of said welding head, said protective gas nozzle means being a front nozzle facing the weld seam area and serving to feed in the protective gas, and a further nozzle being provided behind said front nozzle in the direction of weld progression to feed in an inert gas, and said ducting nozzle means being arranged as a third nozzle behind said further nozzle in the direction of weld progression to feed in a liquid as said cooling agent, with all three nozzles being connected to separate supply lines or ducts, said triplex nozzle means being fixed on a stationary machine bed of said welding head.

13. The apparatus according to claim 12, further comprising a withdrawal system arranged behind said welding head in the direction of weld progression, said withdrawal system for removing the liquid coolant.

14. The apparatus according to claim 12, further comprising: a drying device for supplying hot air arranged at a distance behind said welding head in the direction of weld progression.

15. The apparatus according to claim 12, wherein a mouth opening of said front nozzle in the direction of weld progression is directed towards the welding seam area whereas the mouth openings of the nozzles behind said front nozzle being directed away from the welding seam area in such a manner that said further nozzle builds up a gas curtain between the front nozzle in the direction of weld progression and nozzle feeding in the liquid coolant.

16. A process for continuously welding plates or strips by means of a laser beam comprising the steps of feeding a first stream of protective gas continuously during welding to a welding focus;

simultaneously feeding a liquid cooling agent, as a second stream, to a welding seam area at a location closely spaced rearward of a welding focus in the direction of weld progression; and, simultaneously feeding an inert gas continuously under pressure as a third stream to an area between the liquid coolant and the welding seam area in the direction of weld progression so that, the third stream of inert gas provides a barrier separating the welding seam area from the liquid coolant.

17. The process of claim 16 wherein the liquid coolant and the inert gas are directed away from the welding seam area.

* * * * *